Figure 1:
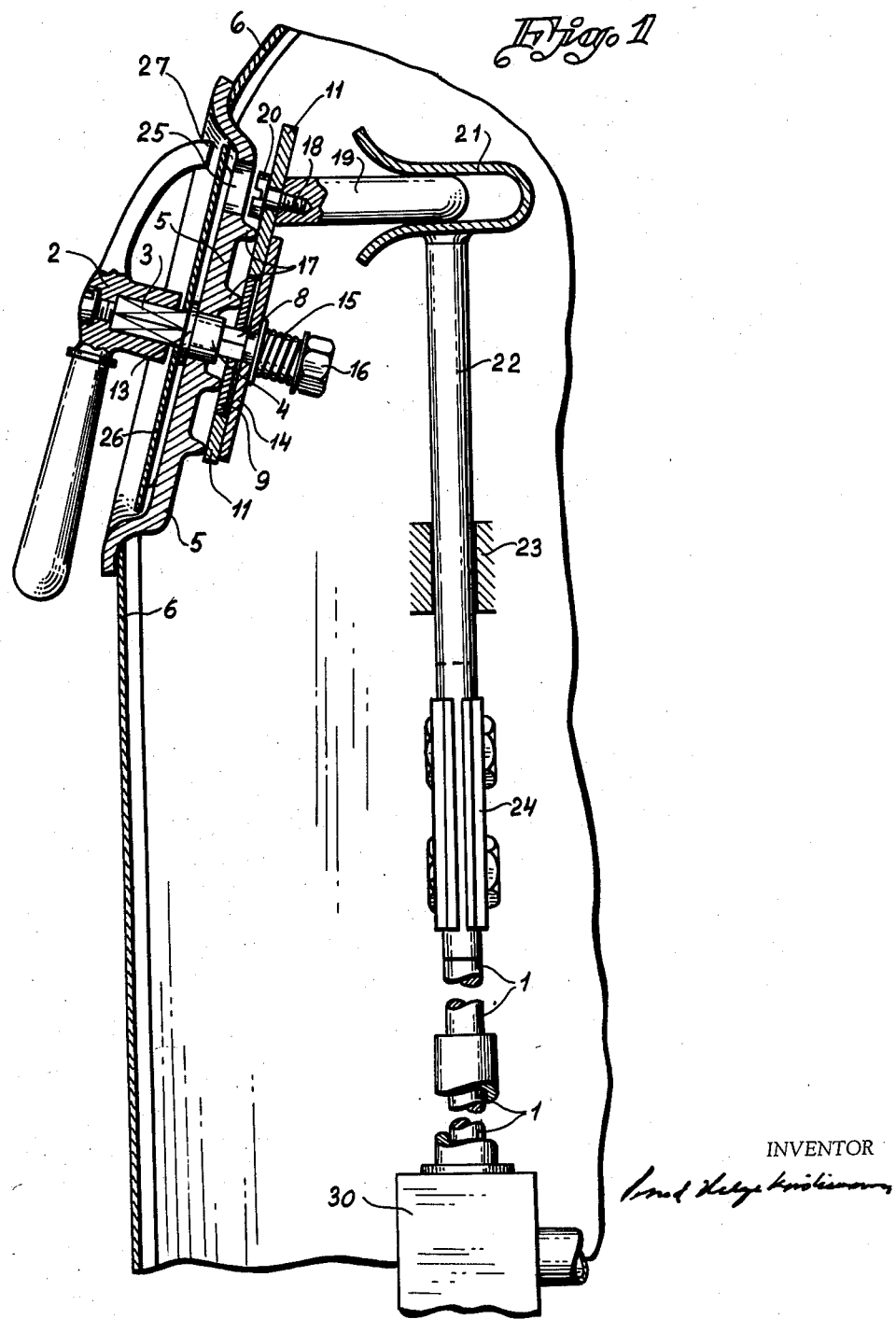

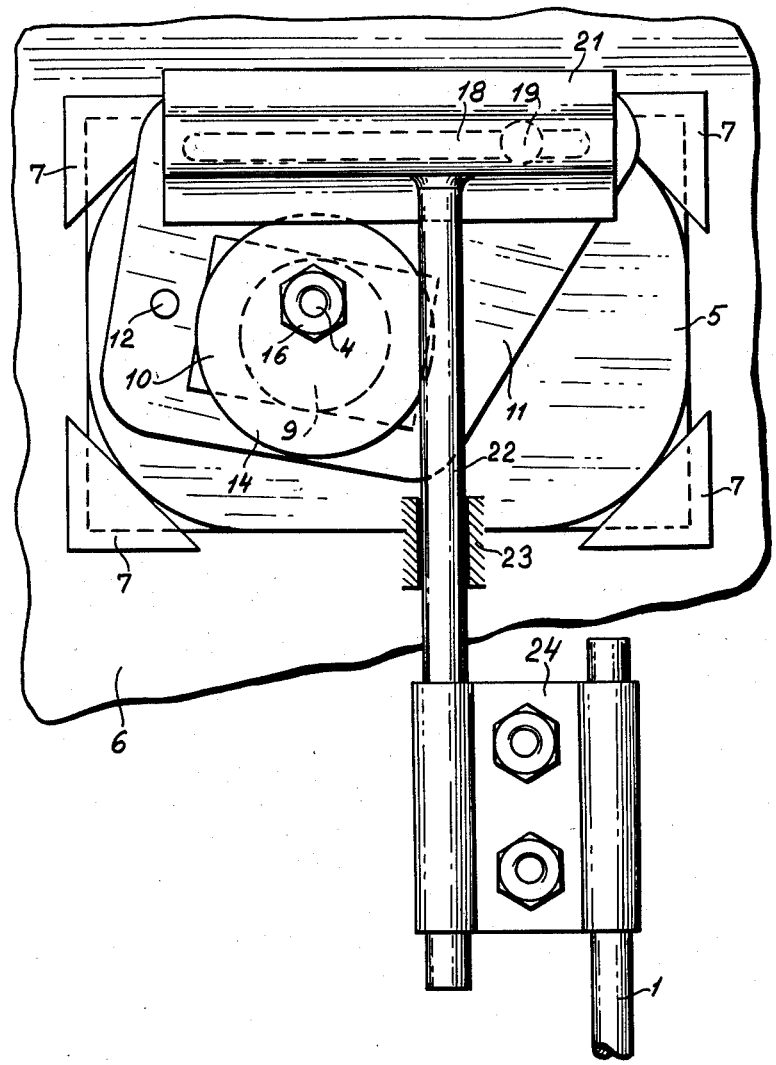

700
United States Patent Office 2,865,209
Patented Dec. 23, 1958

2,865,209

VALVE ADJUSTMENT DEVICES

Svend Helge Kristiansen, Little Nestved, Denmark, assignor, by mesne assignments, to Hi-Press Air Conditioning of America, Inc., New York, N. Y., a corporation Application January 28, 1954, Serial No. 406,777

Claims priority, application Denmark February 2, 1953

6 Claims. (Cl. 74—53)

This invention relates to a valve adjustment device, preferably to be mounted at some distance from the valve itself, and comprising an adjusting lever rotatable by means of an operating handle, on which lever is mounted a motion transmitting member, e. g. a pin, in such a manner that its distance from the axis of rotation of the adjusting lever may be adjusted, and which motion transmitting member is in engagement wtih another motion transmitting member which directly or through a valve motion mechanism is connected to the valve spindle for the operation of the same.

Especially in connection with valves forming part of greater aggregates it is often desirable to be able to undertake such an adjustment of the valve aggregate as will make it possible by a certain turning or moving an adjusting handle to obtain different degrees of opening of the valve itself.

It is possible in a comparatively simple manner to obtain this by special arrangements in the valve itself which may be very advantageous when the valve is easily accessible. It is, however, more difficult when the valve is difficult to get access to, and consequently its adjusting handle is mounted at some distance from the valve.

In such case it is possible to use a valve adjustment device of the kind stated.

In the hitherto known valve adjusting mechanisms of the kind stated the two motion transmitting members are, however, interconnected by means of an adjustable toggle joint, which partly involves a rather complicated construction, partly and especially that the adjustment of the valve adjusting device will be relatively difficult.

An object of the invention is to provide a valve adjustment device of the kind stated above, by which it is possible to undertake the said adjustment independent of the valve and in such a manner that the valve adjustment mechanism is still relatively simple both as regards construction and as regards adjustment.

Another object is to provide a valve adjustment device comprising a supporting aggregate or casing; a valve adjusting member moveably mounted in said aggregate or casing; a supporting member connected to said aggregate or casing; a shaft rotatably mounted in said supporting member; a handle connected to said shaft; a lever rotatably connected to said supporting member; means connecting said shaft and said lever in such a manner that said lever is rotated by a rotation of said shaft; a first motion transmitting member or actuating lever having guide surfaces and being adjustably mounted near said lever in such a manner that the distance between said guide surface and the axis of rotation of said lever may be adjusted; a second motion transmitting member connected to said valve adjusting member and provided with guide surfaces; one of said two motion transmitting members being provided with a groove or slot, the edge surfaces of which constitutes the guide surfaces of this motion transmitting member; the other of said two motion transmitting member being constituted by a pin engaging said slot or groove and the surface parts of which engaging the edge surfaces of said groove or slot constitute the guide surfaces of this transmitting member.

Further details of the valve adjustment device according to the invention will appear from the following specification, in which an embodiment of such device will be described with reference to the drawing, in which:

Fig. 1 shows a sectional view through the device, and
Fig. 2 a rear view of same.

1 is a longitudinally displaceable rod connected to a valve 30. The latter may for instance be a slide valve in which case the rod 1 may e. g. be an extension of the valve spindle. The valve may, however, be of any other type and connected to the rod 1 in such a manner that it may be opened and shut by a displacement of same.

As will be further described below the rod 1 may be moved by turning a handle 2, Fig. 1. The handle 2 is fastened to a square head 3 at the outermost end of a shaft pin 4 which is rotatably mounted in a supporting plate 5. The latter is mounted in an aperture in a wall 6 of the aggregate or casing in which the valve 30 is placed, and secured to the wall 6 by means of clamping butt-plates 7, see Fig. 2.

On the inner side of the supporting plate 5 the shaft pin 4 is provided with a square head 8 on which a circular disc 9 is mounted eccentrically relative to the axis of rotation of the shaft pin 4. The disc 9 is inserted in a square slot or incision 10 in an actuating lever or adjusting lever or plate 11 rotatably mounted in the supporting plate 5 on a swivel 12. The lever 11 is adapted to oscillate about the swivel 12. The disc 9 forms a cam and the square slot 10 a cam follower to bring about oscillation of the lever 11 when the disc 9 is rotated about the pin 4.

The shaft pin 4 abuts with a collar 13 against the outer side of the supporting plate 5 and is otherwise together with the adjusting lever 11 secured to the supporting plate by means of a retaining plate 14 which abuts against the inner side of the lever 11 and is pressed against the same by means of a pressure spring 15 which surrounding the inner end of the shaft pin 4 is inserted between the retaining plate 14 and a nut 16 screwed on the inner end of the pin 4. Thus the mechanism comprising the parts 2 to 5 and 8 to 16 constitute a unit, which may be mounted in the wall 6.

In order to reduce the friction between the adjusting lever 11 and the supporting plate 5 the latter is on its inner side provided with circular ribs or guides 17 against which the adjusting lever 11 abuts.

The adjusting lever 11 is provided with a slot 18 along which a pin 19 projecting from the inner side of the adjusting lever can be adjustably displaced and locked in the adjusted position by means of a clamping screw 20.

The pin 19 is in engagement with a guideway 21 fastened on the upper part of a longitudinally displaceable rod 22 controlled by a guide 23 which is mounted (in a manner not shown) in the aggregate comprising the valve to be adjusted by means of the adjustment device referred to. The rod 22 is by means of an adjustment link 24 rigidly connected to the valve rod 1 so that the latter is displaced together with the rod 22.

It will easily be seen from the drawing that when the handle 2, and consequently the shaft pin 4, is turned the eccentric disc 9 will swing the adjusting lever 11 about the swivel 12 of the latter. This will furthermore cause the pin 19 to swing which is thereby displaced in the guideway 21 at the same time as a longitudinal displacement of the rod 22 takes place thus producing an adjusting movement of the valve.

The extent of this adjusting movement depends, a certain angle movement of handle 2 being presupposed, on the position of the pin 19 along the slot 18. If the pin 19 assumes a position in the vicinity of the left hand end in Fig. 2 of the slot 18, it is possible by turning the handle 2 a certain angle to obtain a comparatively small adjustment movement, whereas when the pin 19 is set at the opposite end of the slot 18, an essentially greater adjustment movement is obtained by the same movement of the handle.

In order from the outside to be able to adjust the pin 19, the supporting plate 5 is provided with a slot 25 in such a manner that when the adjusting lever 11 assumes a certain position preferably one of its end positions it conforms to and lies opposite the slot 18.

Although the persons who are to operate the adjusting device must be able to do so easily, strangers should not be able to do so.

With this end in view the outer side of the supporting plate 5 is provided with a covering plate 26 having a circular center hole for pin 4, and which by means of screws (not shown) is secured to the supporting plate 5 and which covers the slot 25. The covering plate 26 may at the same time serve as a decoration and as an indicator since it may be provided with indicating lines or other similar symbols to which the handle 2 or an indicating member or device 27 connected to or mounted on same may point. This covering plate makes it necessary before adjusting the pin 19 first to remove the handle 2 and thereafter the covering plate 26.

It is often desirable that irrespective of the adjustment of the valve adjusting mechanism the valve should always be set at a certain position when the handle 2 assumes one of its extreme positions. It is generally desired that the closing position of the valve should always correspond to a certain start position for the handle 2 so that it is the degree of opening of the valve in dependence of the adjustment angle of the handle that can be adjusted. Sometimes it may, however, also be the fully open position of the valve that is to correspond to a certain position of the handle so that it is the degree of closing of the valve in dependence of the angle adjustment of the handle that can be adjusted.

To obtain this the slot 18 is in the illustrated embodiment of the invention shaped in such a manner in the adjustment plate 18 and the guideway 21 mounted on the rod 22 in such a manner that the slot 18 and the guideway 21 are parallel relative to each other when the valve assumes one of its extreme positions, and the handle 2 its corresponding start position, confer Fig. 2.

The existence of the adjustment link 24 will always make it possible to take care that the valve gear lies immediately opposite the slot 18 in the said start position and consequently that in this position the valve is actually completely shut or open, whichever is intended.

The invention is not restricted to the illustrated embodiment which within the scope of the following claims may be modified in many different ways.

I claim:

1. An operating mechanism, for use in connection with the remote control of a valve having a reciprocably movable control part, comprising in combination, a supporting structure, a shaft projecting through said structure and being journalled for rotation relative to said supporting structure, a handle secured to said shaft on one side of said structure and manually actuatable to turn said shaft, an actuating lever pivoted relative to said supporting structure and on the other side thereof relative to said handle and at a point spaced from said shaft and adapted to oscillate about said pivot, cam and cam follower means between said shaft and said actuating lever operable for oscillating said actuating lever when said shaft is turned completing a tilting cycle of said actuating lever for each full turn of the shaft, said actuating lever having an elongated path, a pin positionable along said elongated path and adjustably secured to said lever, a guide in driving connection with said valve control part and including an elongated guide way disposed adjacent said actuating lever at said other side of said supporting structure, said pin engaging said guide way thereby transmitting motion from said actuating lever to said guide, said elongated path and said guide way being of similar shape and contour and being parallel to each other when said actuating lever is in a predetermined position, whereby in said predetermined position of said actuating lever the position of said pin may be changed along said elongated path and therewith along said guide way while the guide and the actuating lever are at standstill.

2. In an operating mechanism, as claimed in claim 1, said elongated path being a slot, said pin being positionable along said slot, said slot and guide way being parallel to each other in said predetermined position of said actuating lever.

3. In an operating mechanism, as claimed in claim 1, said elongated path being a straight slot, and said guide way being straight.

4. In an operating mechanism, as claimed in claim 1, said cam and cam follower means including an eccentric secured to said shaft, said actuating lever having a recess, said eccentric engaging said recess.

5. An operating mechanism, for use in connection with the remote control of a valve having a reciprocably movable control part, comprising in combination, a supporting structure, a shaft projecting through said structure and being journalled for rotation relative to said supporting structure, a handle secured to said shaft on one side of said structure and manually actuatable to turn said shaft, an actuating lever pivoted relative to said supporting structure and on the other side thereof relative to said handle and at a point spaced from said shaft and adapted to oscillate about said pivot between a position of rest and a position at an angle thereto, cam and cam follower means between said shaft and said actuating lever operable for oscillating said actuating lever to and from said rest position when said shaft is turned, completing a tilting cycle of said actuating lever for each full turn of the shaft, said actuating lever having an elongated path, a pin positionable along said elongated path and adjustably secured to said lever, a guide in driving connection with said valve control part and including an elongated guide way disposed adjacent said actuating lever at said other side of said supporting structure, said pin engaging said guide way thereby transmitting motion from said actuating lever to said guide, said elongated path and said guide way being of similar shape and contour and being parallel to each other when said actuating lever is in said rest position, whereby in said rest position of said actuating lever the position of said pin may be changed along said elongated path and therewith along said guide way while the guide and the actuating lever are at standstill.

6. An operating mechanism, for use in connection with a valve, having a reciprocably movable control part, comprising in combination, a casing structure having an aperture, a supporting member connected to said structure across said aperture, a shaft traversing said aperture and being journalled for rotation in said supporting member, a handle secured to said shaft externally of said structure and manually actuatable to turn said shaft, an actuating lever pivoted to said supporting member internally of said casing structure at a point spaced from said shaft and adapted to oscillate about said pivot, cam and cam follower means between said shaft and said actuator lever operable for oscillating said actuator lever when said shaft is turned, said actuator lever having a straight slot, a pin adjustably positionably secured to said actuator lever at said slot, a guide in driving connection with said valve control part and including an elongated straight guide way engaged by said pin, said guide way being parallel to said slot in a predetermined position of said actuating lever while both the actuating lever and the guide are at standstill.

(References on following page)

References Cited in the file of this patent

UNITED STATES PATENTS

| | | |
|---|---|---|
| 1,141,223 | Watts | June 1, 1915 |
| 1,563,669 | Snyder | Dec. 1, 1925 |
| 2,301,967 | Nosker | Nov. 17, 1942 |
| 2,314,073 | Campbell | Mar. 16, 1943 |
| 2,480,161 | Prescott | Aug. 30, 1949 |
| 2,617,307 | Drissner | Nov. 11, 1952 |
| 2,666,452 | Sheppard | Jan. 19, 1954 |

FOREIGN PATENTS

| | | |
|---|---|---|
| 801,599 | France | May 23, 1936 |